(12) United States Patent
Arnott et al.

(10) Patent No.: US 9,708,028 B1
(45) Date of Patent: Jul. 18, 2017

(54) MOTORCYCLE SHOCK WITH ASSIST COIL DEVICE, APPARATUS, SYSTEM AND METHOD

(71) Applicant: Arnott T&P Holding, LLC, Merritt Island, FL (US)

(72) Inventors: Adam Michael Arnott, Windermere, FL (US); Matt Edward Kirar, Merritt Island, FL (US)

(73) Assignee: Arnott T&P Holding, LLC, Merritt Island, FL (US)

( * ) Notice: Subject to any disclaimer, the term of this patent is extended or adjusted under 35 U.S.C. 154(b) by 0 days.

(21) Appl. No.: 14/988,342

(22) Filed: Jan. 5, 2016

Related U.S. Application Data

(63) Continuation-in-part of application No. 14/966,678, filed on Dec. 11, 2015.

(51) Int. Cl.
*B62K 25/28* (2006.01)
*B62K 25/04* (2006.01)

(52) U.S. Cl.
CPC ............. *B62K 25/28* (2013.01); *B62K 25/04* (2013.01); *B62K 2025/045* (2013.01); *B62K 2025/048* (2013.01)

(58) Field of Classification Search
CPC ...... B60G 11/56; B60G 11/58; B60G 15/061; B60G 15/06; B60G 15/062; B60G 15/065; B60G 17/021; B60G 17/0521; B60G 17/08; B60G 2500/30; B60G 2500/201; B60G 2202/314; B60G 2202/312
See application file for complete search history.

(56) References Cited

U.S. PATENT DOCUMENTS

| | | | |
|---|---|---|---|
| 2,324,058 A | 7/1943 | Boor |
| 2,571,279 A | 10/1951 | Myklestad |
| 2,856,035 A | 10/1958 | Rohacs |
| 3,024,875 A | 3/1962 | Stultz |
| 4,560,042 A | 12/1985 | Sell |
| 4,566,565 A | 1/1986 | Wicke |
| 4,664,234 A | 5/1987 | Wight |
| 5,172,794 A | 12/1992 | Ward |
| 5,458,219 A | 10/1995 | Anderson |
| 5,833,036 A | 11/1998 | Gillespie |
| 6,193,005 B1 | 2/2001 | Jurrens |
| 6,244,398 B1 | 6/2001 | Girvin |

(Continued)

*Primary Examiner* — Drew J Brown
(74) *Attorney, Agent, or Firm* — Brian S. Steinberger; Law Offices of Brian S. Steinberger, P.A.

(57) ABSTRACT

Single adjustable air suspension shocks with built-in damper device and coil assist, apparatus, system and method for motorcycles. Air suspension systems, devices, apparatus, and methods for allowing motorcycle drivers to increase and decrease compressed air supplies in air suspension devices. Deflating interior air springs/airbags (bladders) inside the devices allows for springs and pistons on shock absorbers in the devices to expand outward separating lower front and rear frame portions which effectively lowers the motorcycle to the ground surface and for the driver to have a firmer ride. Inflating the air springs/airbags (bladders) allows for the springs and the pistons on the shock absorbers in the devices to retract into the devices so that the devices have a more shock absorbing effect giving the rider a smoother ride, which also raises the motorcycles above the ground surface.

22 Claims, 9 Drawing Sheets

(56) References Cited

U.S. PATENT DOCUMENTS

| | | |
|---|---|---|
| 6,357,546 B1 | 3/2002 | Crosby |
| 6,374,966 B1 | 4/2002 | Lillbacka |
| 6,648,309 B2 | 11/2003 | Beck |
| 7,011,174 B1 | 3/2006 | James |
| 7,546,894 B1 | 6/2009 | Glenn |
| 7,559,396 B2 | 7/2009 | Schwindt |
| 7,798,295 B2 | 9/2010 | Jurrens |
| 7,954,792 B2 * | 6/2011 | Adonakis ................. B60G 3/20 267/221 |
| 8,113,322 B2 | 2/2012 | Arnott |
| 8,256,749 B2 * | 9/2012 | Adonakis ................. B60G 3/20 267/221 |
| 8,292,306 B1 | 10/2012 | Arnott |
| 2004/0245746 A1 | 12/2004 | Chamberlain |
| 2009/0206530 A1 | 8/2009 | Arnott |
| 2010/0117320 A1 * | 5/2010 | Grozev ................. B60G 11/58 280/124.16 |
| 2010/0200343 A1 * | 8/2010 | Kondo ................... B60G 13/02 188/267 |
| 2014/0077466 A1 | 3/2014 | Murakami et al. |
| 2014/0239602 A1 * | 8/2014 | Blankenship ...... B60G 17/0152 280/5.515 |
| 2016/0075204 A1 * | 3/2016 | Marking ................. F16F 9/062 267/225 |

* cited by examiner

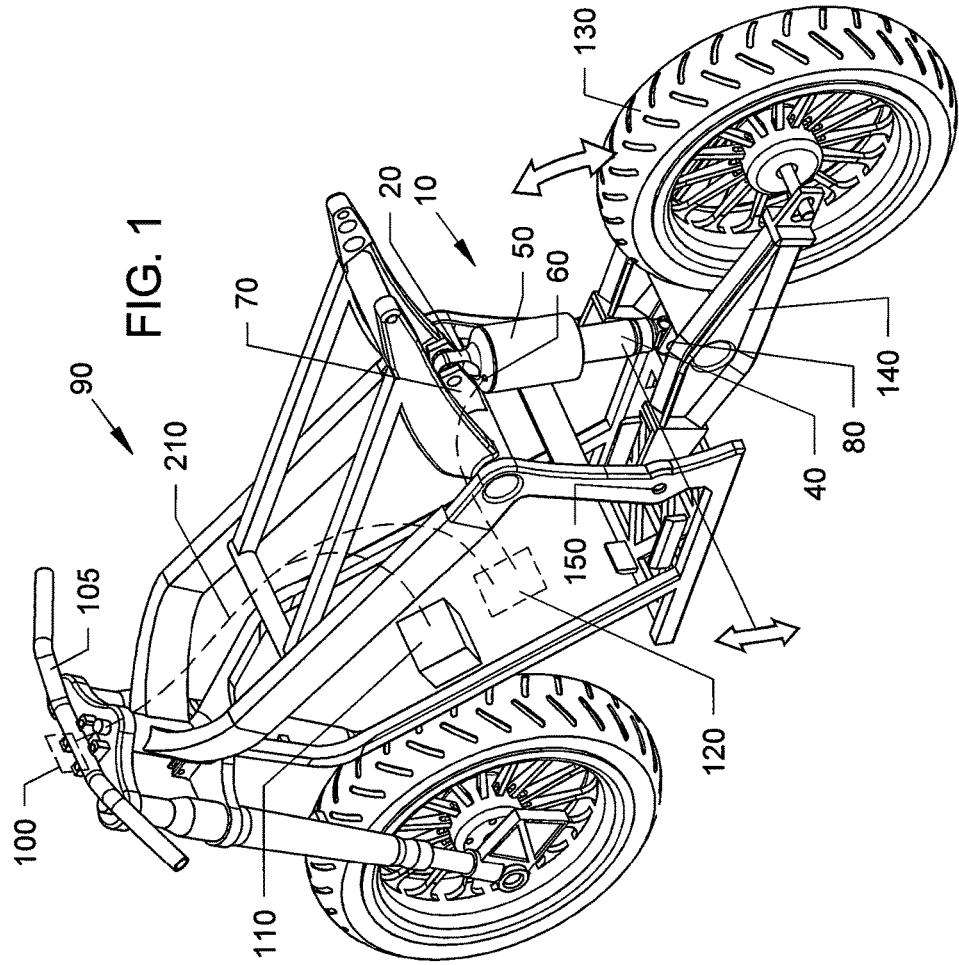
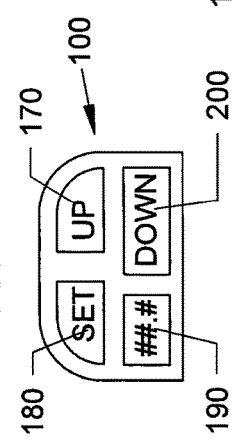
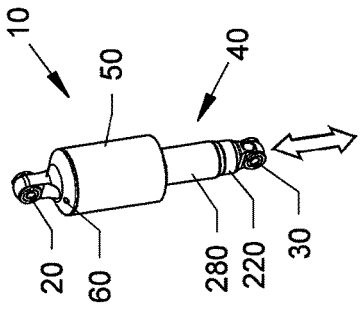

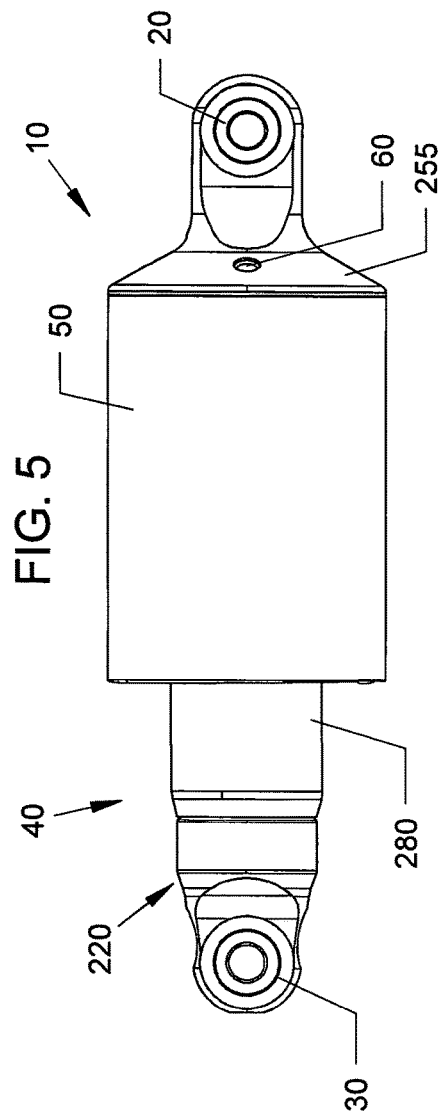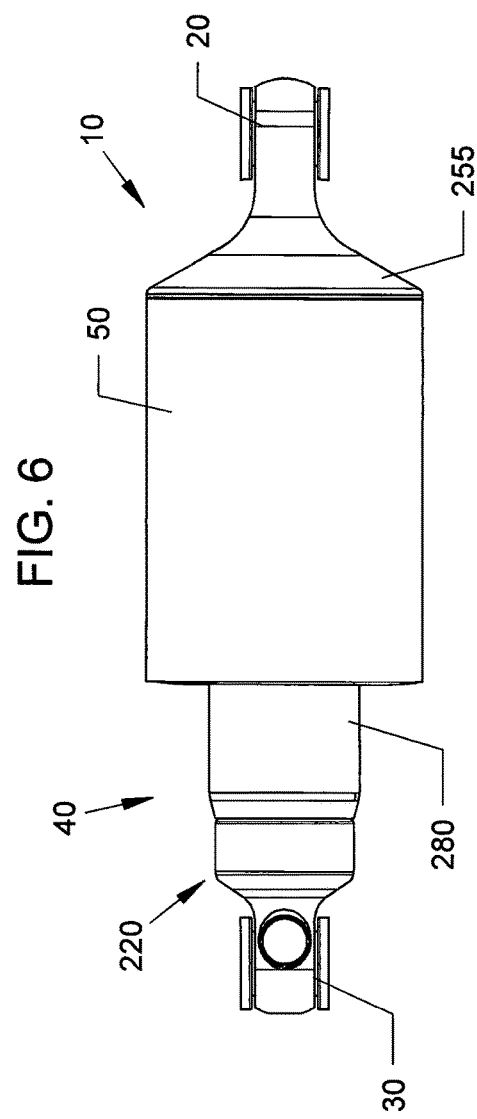

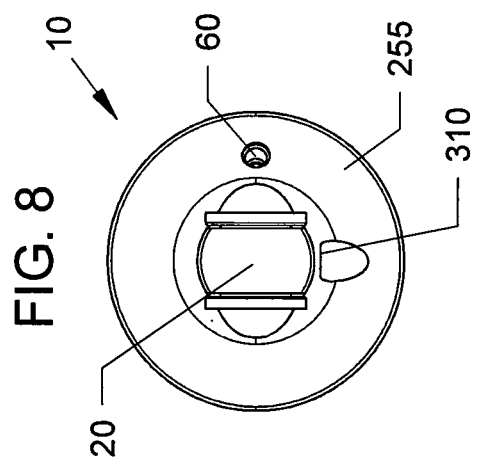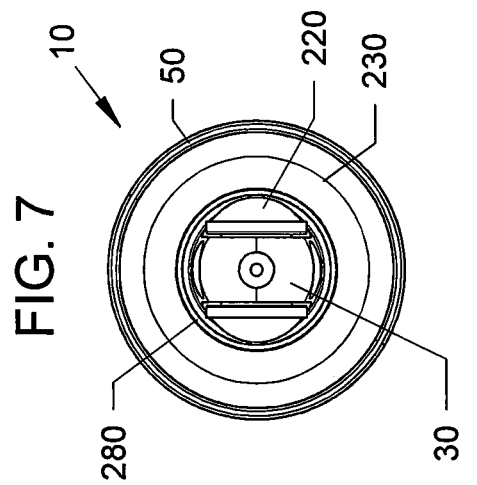

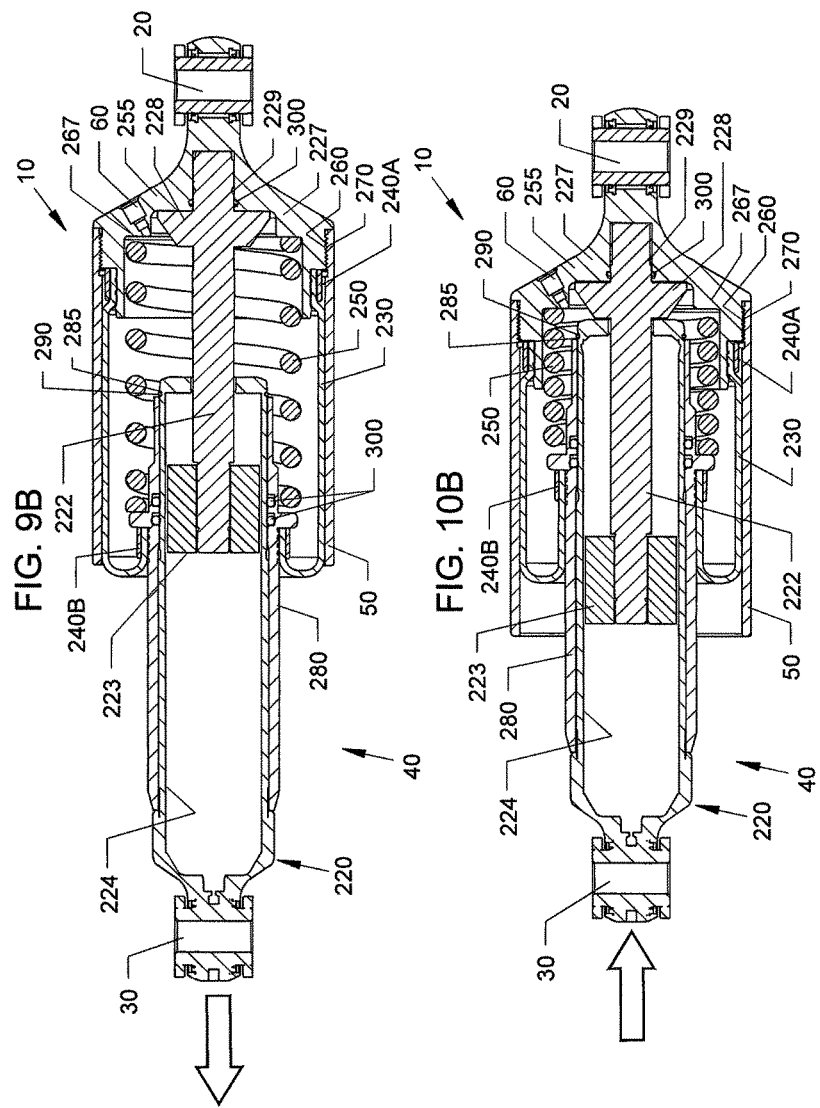

MOTORCYCLE SHOCK WITH ASSIST COIL DEVICE, APPARATUS, SYSTEM AND METHOD

CROSS REFERENCE TO RELATED APPLICATION

This application is a Continuation In Part of U.S. patent application Ser. No. 14/966,678 filed Dec. 11, 2015, which is incorporated by reference in its' entirety.

FIELD OF INVENTION

This invention relates to air suspension and dampers, in particular to single adjustable air suspension shocks with built-in damper device and coil assist, apparatus, system and method for motorcycles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, motorcycles are known to have harsh rides that are not comfortable for many riders such as the elderly, overweight individuals, and women.

Current springs used in motorcycles can be progressive in that their lifespan and use deteriorate over time. For example, as the spring compresses, the spring weakens over time, making the ride less desirable for the riders.

Conventional air suspension systems often result in non-smooth and uncomfortable rides, coupled with undesirable vehicle ride performance.

Various types of air suspension systems have been proposed over the years. U.S. Pat. No. 6,648,309 to Beck describes a piston rod with low/high pressure chambers. U.S. Pat. No. 6,374,966 to Lillbacka describes a piston rod that moves within the chamber and is surrounded by an outer chamber with sealing gaskets. An o-ring seals isolate compartment from environment outside of shock absorber; compressible fluid in inner chamber; coil spring provided about piston rod; air inlet, a fluid, i.e. air, pumped into elastomeric tube so that the inflated elastomeric tube acts as air spring to enhance shock absorbing ability of shock absorber.

U.S. Pat. No. 6,244,398 to Girvin describes a shock absorber with a shaft that extends into a reservoir housing which includes a hydraulic reservoir and gas chamber. The chamber seal includes an o-ring to separate the gas chamber from the hydraulic reservoir. There are springs on the shaft, a piston, and shim washers at the end of the piston, a reservoir cap, reservoir seal, and a bumper.

U.S. Pat. No. 5,833,036 to Gillespie describes an airbag in a reservoir of a cylinder, a piston assembly disposed within an inner cylinder and mounted to a piston rod. The piston rod comprising of piston assembly piston, check valve, a seal ring, seal ring carrier, bypass spring, spring abutment plate, and an end outer cylinder sealed plate with threaded mounting member.

U.S. Pat. No. 5,458,219 to Anderson describes a piston; reservoir containing gas cells. U.S. Pat. No. 5,172,794 to Ward describes a gas bag; piston assembly disposed within inner cylinder; piston rod that moves within piston assembly and extends into rebound chamber; outer cylinder with end cap; seal ring; ring; spring; and an end cap.

U.S. Pat. No. 4,664,234 to Wight; U.S. Pat. No. 4,566,565 to Wicke et al.; and U.S. Pat. No. 4,560,042 to Sell et al.; each describe self pressurized dampers. U.S. Pat. No. 3,024,875 to Stultz describes a shock absorber. U.S. Pat. No. 2,571,279 to Nils O. Mykestad describes a cylinder that defines a fluid reservoir containing a sack where air is introduced to a piston rod with sealing means and springs bear against it. And U.S. Pat. No. 2,324,058 to A. Boor et al. describes a hydraulic shock absorber structure.

U.S. Pat. No. 8,113,322 to Arnott, which has the same assignee as the subject invention, which is incorporated by reference in its' entirety, describes a motorcycle air suspension system and method that requires the use of two identical air suspension devices 1, FIG. 14 mounted side by side to provide adjustable air suspension for the rider.

FIG. 13 shows another prior art side cross-sectional view of a current shock that combines both air suspension through a spring and oil damping in one housing. Similar to Arnott '322, this combined air shock with damping would also be used in a pair arrangement as shown by FIG. 14 of the Arnott '322 patent.

FIG. 13 is a cross-sectional view of a prior art air suspension device with an internal damper 470. In the prior art, assembly 470, includes an oil filled chamber 80 with an internal fixed damping piston 490 having a fixed damping piston shaft 500. Oil metering pass-through holes 510 are through the head of the piston 490. A ring attachment 520 secures the oil filled assembly to a bike frame or suspension member. Inside the air suspension device with internal damper 470 can be an airbag 530, top end 540, housing 550 and spring 560.

Combining both liquid damping with the air shock requires extra seals to keep fluid from leaking out of the housing and also contaminating the air suspension components in the same housing. As such, there can be reliability issues by combining both air suspension and the liquid damping effects in the same housing.

The prior art discloses various types of air suspension systems and their respective components. However, none of the cited references overcomes the problems with the prior art described above. More particularly none of the prior art describes an easily adjustable system for use with motorcycles that allows the rider to have an adjustable ride based on the air suspension cylinders on those motorcycles.

Thus, the need exists for solutions to the above problems with the prior art.

SUMMARY OF THE INVENTION

A primary objective of the present invention is to provide adjustable air suspension shock with built-in damper and coil assist, system, device, apparatus, and method for motorcycles which is less expensive (lower cost) than existing air shocks with damping capability.

A secondary objective of the present invention is to provide adjustable air suspension shock with built-in damper and coil assist system, device, apparatus, and method for motorcycles which have less friction than existing air shocks with damping capability.

A third objective of the present invention is to provide adjustable air suspension shock with built-in damper and coil assist system, device, apparatus, and method for motorcycles which uses less parts than existing air shocks with damping capability.

A fourth objective of the present invention is to provide adjustable air suspension shock with built-in damper and coil assist system, device, apparatus, and method for motorcycles which eliminates lipped seals with a damper case and reduces or eliminates leaky air seals, than existing air shocks with damping capability.

A fifth objective of the present invention is to provide adjustable air suspension shock with built-in damper and coil assist system, device, apparatus, and method for motorcycles which is more reliable than existing air shocks with damping capability.

A sixth objective of the present invention is to provide adjustable air suspension shock with built-in damper and coil assist system, device, apparatus, and method for motorcycles to allow the rider to adjust the suspension to accommodate their personal weight as well as any cargo weight with a smoother ride base on a smoother and comfortable ride with suspension, adjustable suspension height, and adjustable suspension stiffness.

A seventh objective of the present invention is to provide adjustable air suspension shock with built-in damper and coil assist system, device, apparatus, and method for motorcycles so that an increase of air will stiffen the ride and raise the suspension, while a release of air will soften the ride and lower the suspension.

An eighth objective of the present invention is to provide adjustable air suspension shock with built-in damper and coil assist system, device, apparatus, and method for motorcycles to allow the shock absorber(s) to act as an extendable and retractable rod to lower or raise the vehicle.

A ninth objective of the present invention is to provide adjustable air suspension shock with built-in damper and coil assist system, device, apparatus, and method for motorcycles where tuning air suspension is done to individual tastes and usually reduced to a few minutes via onboard adjustability.

A tenth objective of the present invention is to provide adjustable air suspension shock with built-in damper and coil assist system, device, apparatus, and method for motorcycles where air suspension can be instantly set to specific driving conditions, resulting in improved drive handling.

An eleventh objective of the present invention is to provide adjustable air suspension shock with built-in damper and coil assist system, device, apparatus, and method for motorcycles where adjustability can be customized between various settings that are smooth and comfortable, firm and rigid, or somewhere in the middle. Vehicle rider's performance can be based on the rider's desired settings, with existing components on the motorcycle.

A twelfth objective of the present invention is to provide adjustable air suspension shock with built-in damper and coil assist system, device, apparatus, and method for motorcycles where adjustability can be based on the riders height, weight, desired ride comfort levels, and other customizations.

The air shock includes an air bag (rolling diaphragm) air shocks, which includes the addition of a coil helper spring. The helper spring helps extend the shock so that the required air pressure in the air bag can be lower to support a given load. Unlike shocks that combine air & a spring together, there are none that use an air bag coupled with a spring. Some shocks use a lipped seal that seals against the damper case. Those designs have much more friction in the system & are prone to leaky air seals. The invention design does not have those problems.

Unlike factory installed air suspension shocks, the invention allows the user to raise or lower the rear shocks through the full range of the suspension travel. This gives the rider the flexibility of setting the height of the rear suspension based on the rider's weight, height, and preference, helping ensure both safety and comfort through enhanced control and stability.

The invention can be manufactured to be used in motorized or non-motorized vehicles. This invention uses an inflatable air spring or rubber/elastomeric airbag/bladder, a shock absorber, a coil spring along with an hydraulic damper.

The benefits of this invention are a smoother suspension, adjustable suspension height, and adjustable suspension stiffness. A practical application of this invention would be on any motorcycle configuration as well as on other vehicles. The end user of the product can adjust the suspension to accommodate their personal weight as well as any cargo weight. This adjustability of the suspension is what improves the ride characteristics of the motorcycle for each individual user.

Conventional, stock, and after-market suspension are preset to a specific maximum weight accommodation level. This preset suspension does not always provide the best ride or handling. The invention allows the user to adjust the suspension levels of the vehicle according to their preference. By allowing the user to adjust the suspension level, the adjustable invention provides a comfortable ride, which in turn provides a more enjoyable ride experience. The suspension will absorb the right amount of shock or energy to prevent jerky handling, and adjusting the invention to the appropriate setting will allow the vehicle to handle safer than with a conventional or stock suspension. Air is pumped into and fills the air spring/airbag/bladder, which enables this adjustability; an increase of air will stiffen the ride and raise the suspension, while a release of air will soften the ride and lower the suspension.

The coil spring may or may not be used in some assemblies. Acting as a lift helper, the coil spring is used to decrease the amount of air pressure that would be needed to lift a load. It keeps the vehicle at a somewhat standard level, so that adjusting the lift level is not entirely dependent upon air pressure. In fact, with this invention, a minimal amount of air pressure is needed.

The invention combines a shock absorber with inflatable air spring/airbag/bladder and spring along with O-rings and other components.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective view of motorcycle frame with and adjustable air shock device with built-in damper and coil assist mounted thereon.

FIG. 1A is an enlarged view of a handlebar control panel shown in FIG. 1.

FIG. 1B is a perspective view of the adjustable air shock device with built-in damper and coil assist from FIG. 1.

FIG. 5 is a top view of the shock assembly of FIG. 4.

FIG. 6 is a front view of the shock assembly of FIG. 5.

FIG. 7 is a left end view of the shock assembly of FIG. 5.

FIG. 8 is a right end view of the shock assembly of FIG. 5.

FIG. 9B is a cross-sectional view of the shock assembly with extended assembly of FIG. 9A.

FIG. 10B is a cross-sectional view of the shock assembly with the compressed w damper/helper spring/air spring assembly of FIG. 10A.

DESCRIPTION OF THE PREFERRED EMBODIMENTS

Figure 2:
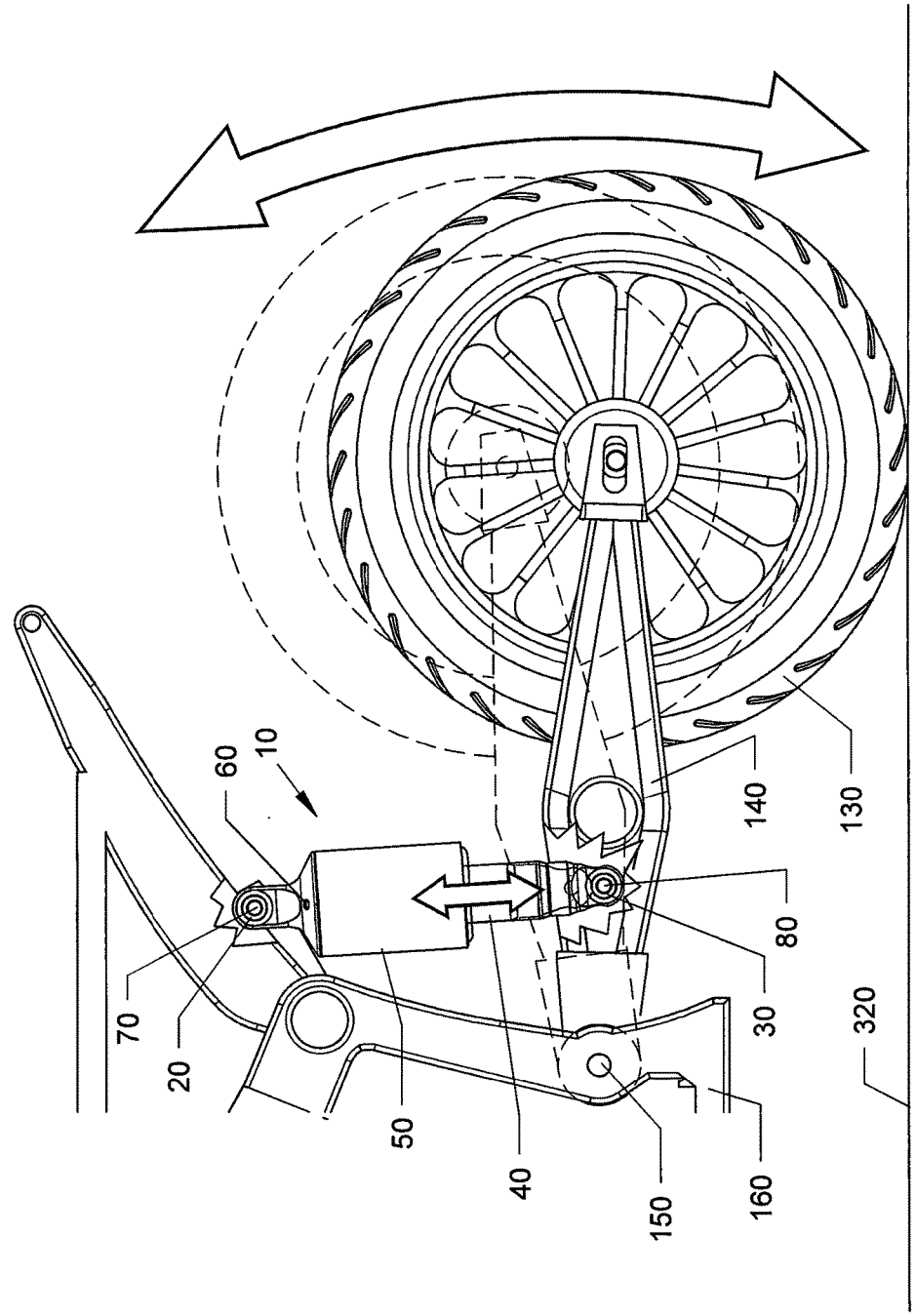
FIG. 2 is a perspective enlarged view of the novel adjustable air shock device with built-in damper and coil assist assembly shown in FIG. 1

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

This application is a Continuation In Part of U.S. patent application Ser. No. 14/966,678 filed Dec. 11, 2015, entitled: Decoupled Damper and Air spring Suspension System, Device, Apparatus and Method for Motorcycles, which is incorporated by reference in its' entirety.

A list of the components will now be described.
10 Shock device with assist coil.
20 Fixed end ring attachment
30 Reciprocating end ring attachment.
40 Reciprocating damper assembly.
50 Air bag can.
60 Compressed air inlet.
70 Fixed end attachment point on motorcycle (prior art).
80 Reciprocating end attachment point on motorcycle rear wheel mount frame
90 Motorcycle assembly 100 Air suspension control mounted on motorcycle handlebar.
105 Motorcycle handlebar (prior art).
110 Battery (prior art).
120 Air compressor.
130 Motorcycle rear wheel/tire assembly
140 Pivoting rear wheel frame
150 Pivot axis for rear wheel frame
160 Motorcycle frame.
170 Control button adds compressed air to the shock assembly and lifts the back of the bike.
180 Set button can lock the compressed air valve after the desired pressure is attained.
190 Air gauge shows air pressure in shock assembly.
200 Control button bleeds compressed air from shock assembly and drops the back of the bike.
210 Control lines from air suspension control.
220 damper assembly
222 Damper shaft.
223 Damper piston.
224 Damper cylinder.
227 inner step
228 Bumper
229 shaft O-ring in Groove
230 Air Bag.
240A Upper Crimp ring.
240B Lower Crimp ring.
250 Coil spring.
255 Top of shock assembly.
260 External thread on top of shock.
267 Second inside step
270 Internal thread on air bag can.
280 Piston sleeve. Fits over purchased damper assembly.
284 Spring seat/shelf
285 Groove in purchased damper assembly for retaining ring.
290 Retaining ring. Fits into groove on purchased damper assembly to secure piston sleeve.
300 O-ring seals.
310 Set screw. Threads into top of shock and secures rod end of damper assembly.
320 Road surface.

FIG. 1 is a perspective view of motorcycle assembly 90 with an adjustable air shock device 10 with built-in damper and coil assist mounted thereon with air suspension control panel 100. FIG. 1A is an enlarged view of a handlebar control panel 100 shown in FIG. 1.

FIG. 1B is a perspective view of the adjustable air shock device 10 with built-in damper and coil assist from FIG. 1.

FIG. 2 is a perspective enlarged view of the novel adjustable air shock device 10 with built-in damper and coil assist assembly shown in FIG. 1 The shock device 10 extended is shown in solid lines in this view. The motorcycle rear wheel 130, and wheel frame 140 are also shown in solid lines and rotated fully clockwise as would be their position with the shock device 10 full extended. The compressed shock device 10 is shown in dashed lines in this view. The wheel 130 and wheel frame 140 rotated fully counterclockwise, as they would be with the shock device 10 compressed, are also shown in dashed lines.

Figure 3:
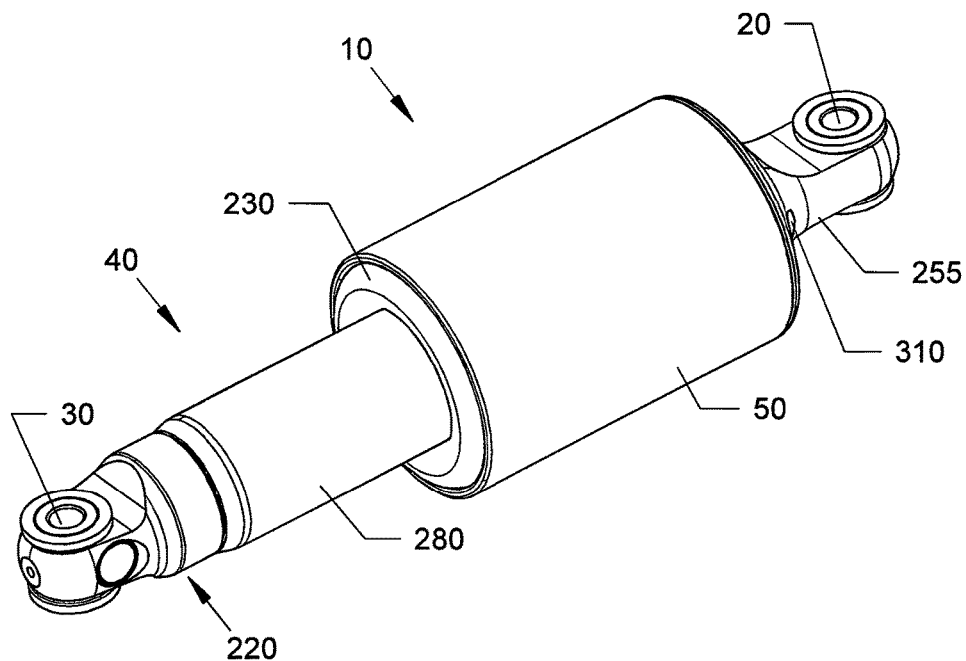
FIG. 3 is a top perspective view of the adjustable air shock device with built-in damper and coil assist assembly of FIGS. 1 and 2 with reciprocating piston assembly extended.

FIG. 3 is a top perspective view of the adjustable air shock device 10 with built-in damper and coil assist assembly of FIGS. 1 and 2 with reciprocating piston assembly 40 extended.

Figure 4:
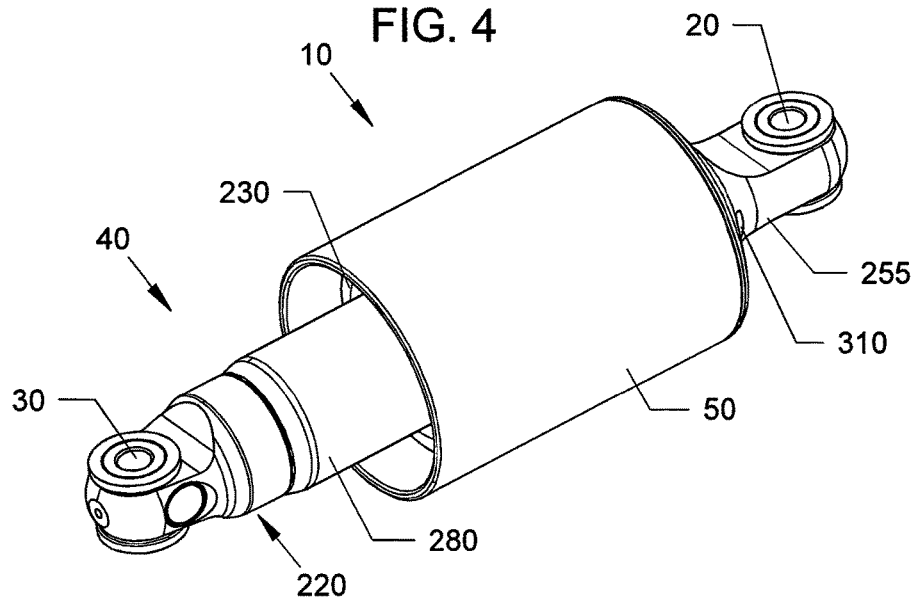
FIG. 4 is another top perspective view of the assembly of FIG. 3 with damper/spring/air spring compressed.

FIG. 4 is another top perspective view of the device 10 of FIG. 3 with piston assembly 40 compressed. FIG. 5 is a top view of the shock device 10 with compressed piston assembly 40 of FIG. 4. FIG. 6 is a front view of the shock device 10 with compressed piston assembly 40 of FIG. 5. FIG. 7 is a left end view of the shock device 10 of FIG. 5. FIG. 8 is a right end view of the shock device 10 of FIG. 5.

Figure 9A:
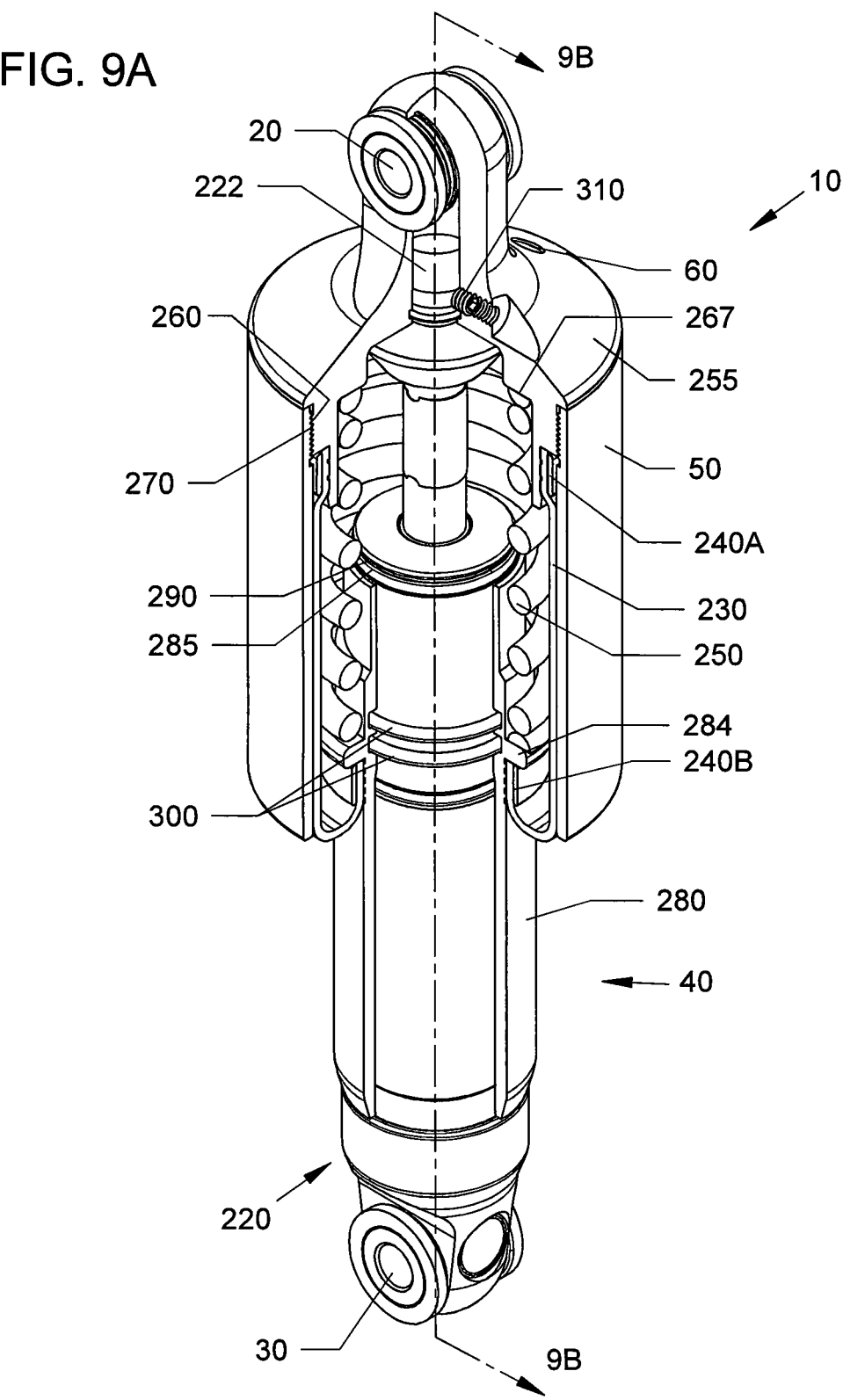
FIG. 9A is a partial cross-sectional perspective view of the FIG. 3 shock assembly with damper/helper spring/air spring assembly extended.

FIG. 9A is a partial cross-sectional perspective view of the FIG. 3 shock device 10 with damper assembly 40 extended. FIG. 9B is a cross-sectional view of the shock device 10 with extended damper assembly 40 of FIG. 9A.

Figure 10A:
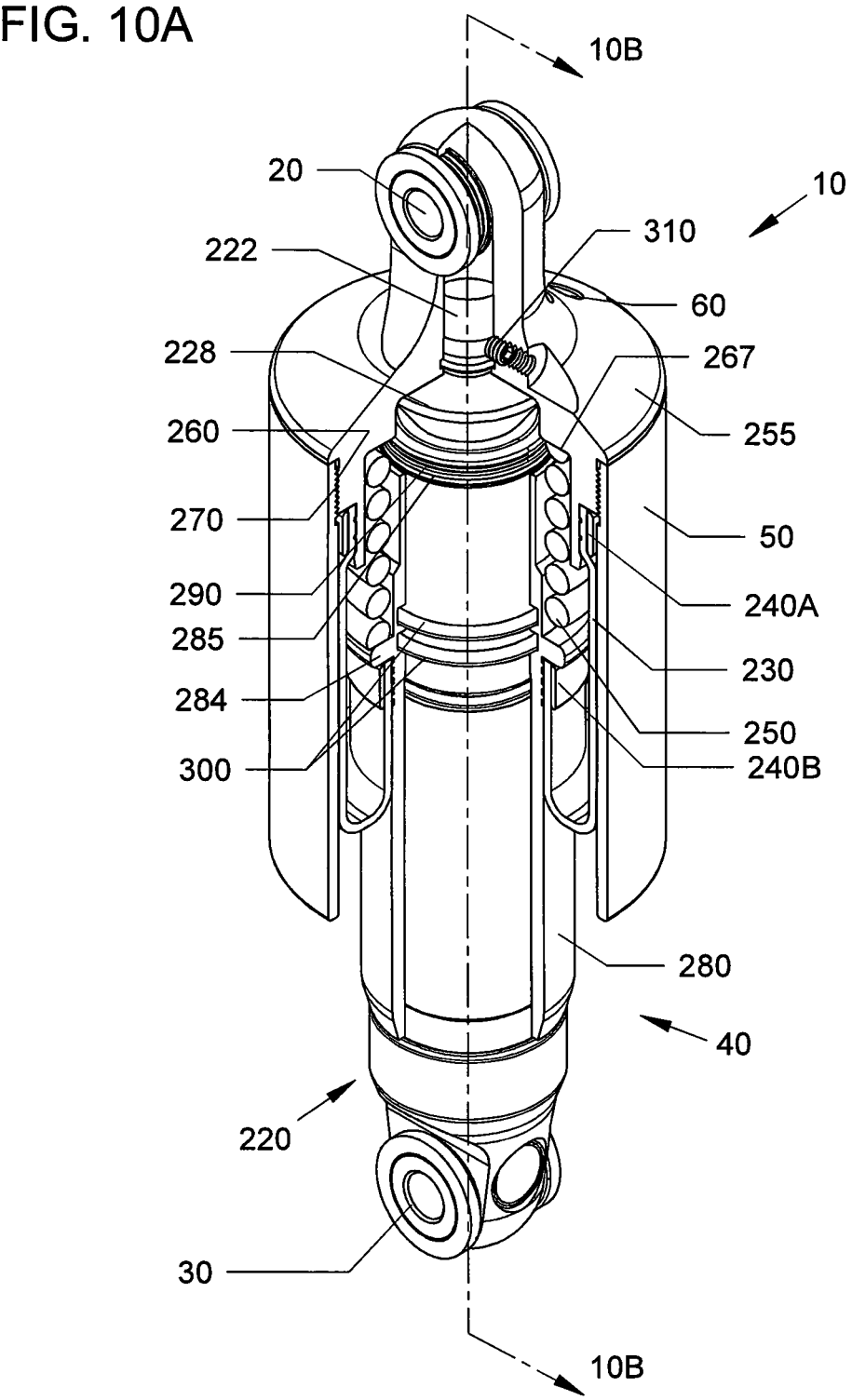
FIG. 10A is a partial cross-sectional perspective view of the FIG. 4 shock assembly with damper/helper spring/air spring assembly compressed.

FIG. 10A is a partial cross-sectional perspective view of the FIG. 4 shock device 10 with damper assembly 40 compressed. FIG. 10B is a cross-sectional view of the shock device 10 with compressed damper assembly 40 of FIG. 10A.

Figure 11:
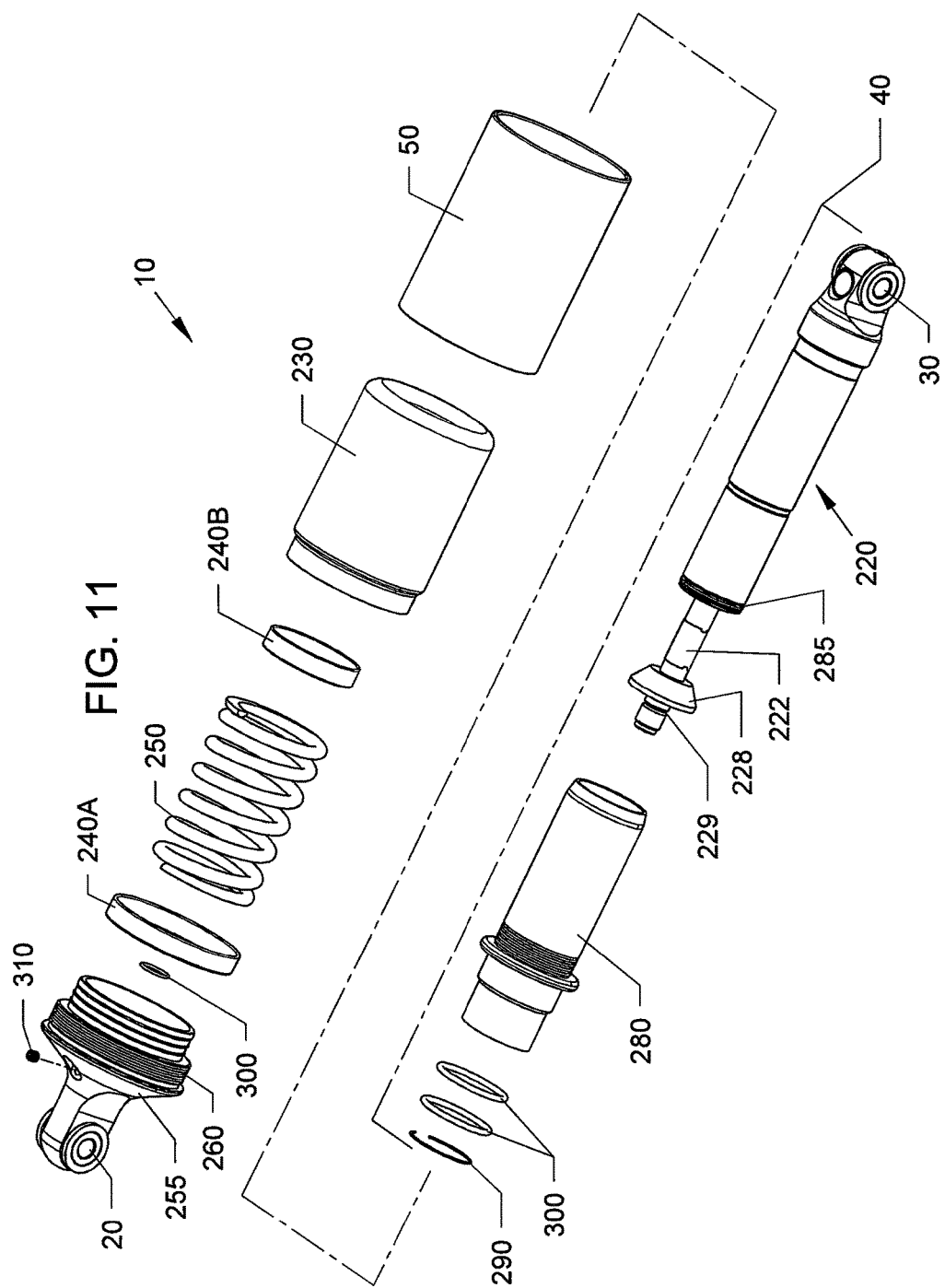
FIG. 11 is an exploded perspective view of the adjustable air shock device with built-in damper and coil assist shown in the preceding figures.

FIG. 11 is an exploded perspective view of the adjustable air shock device 10 with built-in damper and coil assist shown in the preceding figures.

Referring to FIGS. 1, 1B and 2-11, the shock device 10 with assist coil 250, can include a fixed end ring attachment 20 which can pivotally attach to an upper fixed end attachment point 70 on motorcycle 90. Shock device 10 with assist coil 250 can have an opposite end with reciprocating end ring attachment 30 attached to a reciprocating end attachment point 80 on a lower portion on a pivoting rear wheel frame 140 on the motorcycle 90, where rear wheel frame 140 can pivot relative to a pivot axis 150 point on the rear frame 140.

The air shock device 10 with assist coil 250 can include a top 255 with a compressed air inlet 60 with an air bag can 50 having a cylindrical shape. The air bag can 50 being threadably attached to the top 255 by external thread 260 and internal thread 270 (FIGS. 9A, 10A). An upper end of damper piston shaft 222 can be held inside of top 255 by a set screw 310 that screws into side O-ring 229 in groove 255, with O-ring seals 300 sealing about the upper end of the shaft 222 while an enlarged end of 228 is about the piston shaft 222 abuts against an inner step 227 inside the top 225.

A lower end of damper piston shaft 222 can include a damper piston 223 with a larger diameter than the shaft 222. Damper piston 223 allows for damper cylinder 224 which is part of damper assembly 220 to slide up and down relative to the damper piston 223. Damper assembly 220 with the reciprocating piston shaft 222, that can function as a hydraulic shock absorber, such as, but not limited to the hydraulic shock absorber shown and described in U.S. Pat. No. 2,856,035 to Rohacs, which is incorporated by reference.

Inside the air bag can 50 can include an air bag 230 having an upper end held in place by a crimp ring 240A against an upper inner wall of the air bag can 50. The air bag 230 can have a lower end held in place by another crimp ring 240B locked about an upper portion of piston sleeve 280.

A coil spring 250 can have an upper end abutting against a second step 267 inside the top 255 of the shock device 10. Coil spring 250 can have a lower end that abuts against an upper surface of shelf 284 which extends outward from piston sleeve 280. A retaining ring 290 in groove 285 and additional seals 300 allow for sealing the air chamber.

Referring to FIGS. 1-11, a control panel 100 can be mounted on the motorcycle handlebars 105, with a battery 110 powering an air compressor 120 mounted on the motorcycle 90.

An airline can be attached between the air compressor 120 and the air inlet 60 on the shock device 10, and allows air to be injected into the air inlet 60 into the interior chamber inside the air bag 230 inside of the air bag can 50.

On the panel 100, switches 170, 200 can be push button switches which either add compressed air to the air shock assembly 10 by depressing button 170, or remove air from the air shock assembly 10 by pressing on button 200.

Control button 170 adds compressed air to the air bag 250 in shock device 10 and can lift the back of the motorcycle 90. Control button 200 when pressed can bleed compressed air from air bag 230 in shock device 10 which results in dropping the back of the motorcycle 90.

Set button 180 can lock the compressed air valve after the selected pressure in the air bag 230 is reached.

Air gauge 190 displays air pressure in PSI inside the shock device 10.

The depressible buttons 170, 200 allow for instant inflation and deflation of the airbag (air bladder) 230 within the air shock assembly 10, and allow the driver to achieve desired operating conditions of the air shock assembly 10 in seconds.

The air shock assembly 10 can operate similar to the combined air suspension device 1, shown and described in U.S. Pat. No. 8,113,322 to Arnott, which is incorporated by reference in its' entirety.

Here, an operating gauge 190 can show in real-time the pressure of compressed air in air shock assembly 10, which can run from approximately 0 PSI (pounds per square inch) for minimum pressure level to as much as approximately 250 PSI for maximum pressure loads. A set button 180 can be preset to different pressure levels so that the operator can immediately depress to various pre-programmed pressure states for settings such as but not limited to states that are smooth and comfortable, firm and rigid, or somewhere in the middle. The rider can further make adjustments to the air suspension devices 1 based on their height, weight, and any other customized conditions as desired.

Referring to FIGS. 1, 1A, 9A, 9B, 10A, 10B, as compressed air is pumped into compressed air inlet 60, airbag 230 expands downward (inflates) within can 50, while allowing spring 250 to naturally expand to a normal coil expanded state. While in a compressed air state with the airbag (bladder) inflated, the more air added, the firmer the ride is for the rider on the motorcycle.

Removing Compressed Air (Deflating Airbag (Bladder))

Referring to FIGS. 1, 1A, 9A, 9B, 10A, 10B as compressed air is released outward from air inlet 60, airbag 230 retracts (deflates) within airbag can 50, while compressing spring 250 to a compressed state. While in an uncompressed air state with the airbag (bladder) deflated, the more air removed, the smoother the ride is for the rider on the motorcycle. The greater amount of shock cushion effect results in a smoother ride.

While the figures show the novel combination of air shock assembly 10 and damper assembly 20 mounted in one arrangement, the air shock assembly 10 and damper assembly 20 can be oppositely mounted to the motorcycle.

Although the preferred embodiment shows the air shock device 10 mounted in a vertical orientation, the novel air shock device 10 can be mounted horizontally on motorcycles where the existing shocks/springs are mounted.

While the preferred embodiment describes the invention as being attached to two wheeled vehicles, such as motorcycles, the invention can be applied to and used with other vehicles.

Although the invention describes use of the air shock device with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An adjustable air shock with coil assist for two wheeled vehicles, comprising:
    an air shock having a housing with closed end and a opposite facing open end;
    a fluid damper having a first end attached inside of the air shock housing adjacent to the closed end, and a second end protruding from the open end of the air shock housing so that the first end and second end move from a retracted position to an extended position relative to the air shock housing, the damper having a damper cylinder;
    a separate sleeve for fitting about the damper cylinder, the sleeve having an outwardly extending shelf,
    a rolling diaphragm having one end attached inside the air shock housing adjacent to the closed end, and another end attached to an-outside of the sleeve; and
    an assist spring inside of the air shock housing positioned between the closed end of the air shock housing and the shelf on the sleeve, wherein the adjustable air shock with coil assist is adaptable to be mounted in a vertical position between a pivoting rear wheel frame and upper fixed rear frame portion of a two wheeled vehicle.

2. The adjustable air shock with coil assist of claim 1, wherein the rolling diaphragm includes an air bag.

3. The adjustable air shock with coil assist of claim 2, wherein the fluid damper includes a hydraulic fluid damper with reciprocating piston.

4. The adjustable air shock with coil assist of claim 2, wherein the assist coil includes a coil spring wrapped about an upper end portion of the fluid damper.

5. The adjustable air shock with coil assist of claim 4, further including:
    a compressed air source attached to the closed end of the air shock; and
    a control for adjusting compressed fluid levels between the compressed air source and the air shock housing, wherein increasing and inflating compressed fluid levels inside the air shock housing causes rolling diaphragm to retract in and extend out of the air shock housing to increase and decrease.

6. The adjustable air shock with coil assist spring of claim 5, wherein the control includes:
    an increase switch for adding compressed air into the rolling diaphragm; and
    a decrease switch for releasing compressed air from the rolling diaphragm.

7. The adjustable air shock with coil assist of claim 2, further including:
    a compressed air source attached to the closed end of the air shock; and
    a control for adjusting compressed fluid levels between the compressed air source and the air shock housing, wherein increasing and inflating compressed fluid levels inside the air shock housing causes the rolling diaphragm to retract in and extend out of the air shock housing.

8. The adjustable air shock with coil assist spring of claim 7, wherein the control includes:
    an increase switch for adding compressed air into the rolling diaphragm; and
    a decrease switch for releasing compressed air from the rolling diaphragm.

9. The adjustable air shock with coil assist of claim 1, wherein the fluid damper includes a hydraulic fluid damper with reciprocating piston.

10. The adjustable air shock with coil assist of claim 1, wherein the assist coil includes a coil spring wrapped about an upper end portion of the fluid damper.

11. The adjustable air shock with coil assist of claim 1, further including:
    a compressed air source attached to the closed end of the air shock; and
    a control for adjusting compressed fluid levels between the compressed air source and the air shock housing, wherein increasing and inflating compressed fluid levels inside the air shock housing causes the rolling diaphragm to retract in and extend out of the air shock housing.

12. The adjustable air shock with coil assist spring of claim 11, wherein the control includes:
    an increase switch for adding compressed air into the rolling diaphragm; and
    a decrease switch for releasing compressed air from the rolling diaphragm.

13. The adjustable air shock with coil assist of claim 1, wherein the two wheeled motorized vehicle is a motorcycle.

14. The adjustable air shock with coil assist of claim 1, further comprising:
    sealing rings between the separate sleeve and the damper cylinder.

15. A method of providing a shock with a coil assist spring for two wheeled with vehicles, comprising the steps of:
    providing a two wheeled vehicle having a front wheel and a rear wheel;
    providing a frame for the vehicle having a front frame portion attached to the front wheel, and a rear frame portion attached to the rear wheel;
    providing an air shock in a housing having one end extendable and retractable from the air shock housing;
    providing a hydraulic damper in the air shock housing, with one end extendable and retractable from the air shock housing, the damper having a damper cylinder;
    providing a separate sleeve for fitting about the damper cylinder, the sleeve having an outwardly extending shelf;
    mounting a coil assist spring inside of the air shock housing with one end on the shelf the sleeve and an opposite end inside of the air shock; and
    providing air shock and damping to the vehicle with the air shock and damper housing having the coil assist spring.

16. The method of claim 15, further comprising the step of:
    adjusting compressed fluid levels in the air shock assembly.

17. The method of claim 15, further comprising the step of:
    inflating an air bag inside of the air shock housing to raise the two wheeled vehicle over the ground surface.

18. The method of claim 17, wherein inflating and the increasing of compressed fluid levels inside the air shock housing includes the step of:
    providing a firmer ride to a rider on the two wheeled vehicle.

19. The method of claim 15, further comprising the step of:

deflating the air bag inside of the air shock housing to lower the two wheeled vehicle to the ground surface.

20. The method of claim 19, wherein deflating and the decreasing of compressed fluid levels inside the air shock housing includes the step of:

providing a smoother ride to a rider on the two wheeled vehicle.

21. The method of claim 15, further comprising the steps of:

providing a rolling diaphragm having one end attached inside the air shock housing adjacent to the closed end, and another end attached to an outside of the sleeve.

22. The method of claim 15, further comprising the steps of:

providing sealing rings between the separate sleeve and the damper cylinder.

* * * * *